United States Patent
Bhanage

(10) Patent No.: US 9,635,586 B2
(45) Date of Patent: Apr. 25, 2017

(54) METHOD AND APPARATUS FOR USING CALL ADMISSION CONTROL FOR CLIENT BALANCING

(71) Applicant: Aruba Networks, Inc., Sunnyvale, CA (US)

(72) Inventor: Gautam Bhanage, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 76 days.

(21) Appl. No.: 14/699,209

(22) Filed: Apr. 29, 2015

(65) Prior Publication Data
US 2016/0323780 A1    Nov. 3, 2016

(51) Int. Cl.
H04J 1/14         (2006.01)
H04W 28/08    (2009.01)
H04W 48/16    (2009.01)
H04W 76/02    (2009.01)
H04W 48/06    (2009.01)

(52) U.S. Cl.
CPC .......... *H04W 28/08* (2013.01); *H04W 48/06* (2013.01); *H04W 48/16* (2013.01); *H04W 76/027* (2013.01)

(58) Field of Classification Search
CPC .................................................. H04W 28/16
USPC ....................... 370/396, 426, 496
See application file for complete search history.

(56) References Cited

U.S. PATENT DOCUMENTS

| | | | |
|---|---|---|---|
| 7,295,514 B2 | 11/2007 | Cha et al. | |
| 8,346,275 B2 * | 1/2013 | Ogura | H04W 28/16 370/229 |
| 2007/0076612 A1 | 4/2007 | Iyer et al. | |
| 2007/0091839 A1 * | 4/2007 | Abdelhamid | H04W 8/005 370/329 |
| 2007/0097862 A1 * | 5/2007 | Moon | H04L 12/5695 370/230 |
| 2007/0165610 A1 * | 7/2007 | Tseng | H04L 29/06027 370/356 |
| 2007/0195818 A1 * | 8/2007 | Stephenson | H04W 28/20 370/468 |
| 2007/0286177 A1 * | 12/2007 | Yamada | H04W 28/16 370/356 |
| 2008/0285543 A1 | 11/2008 | Qiu et al. | |

(Continued)

OTHER PUBLICATIONS

PCT International Search Report cited in Appl. No. PCT/US2016/029718; mailed Aug. 4, 2016; 3 pages.

*Primary Examiner* — Ricky Ngo
*Assistant Examiner* — Dewanda Samuel
(74) *Attorney, Agent, or Firm* — Hewlett Packard Enterprise Patent Department

(57) ABSTRACT

The present disclosure discloses a system and method for using call admission control for client balancing. Specifically, a network device receives a message from a first access point in a network indicating that the first access point has rejected a call request received by the first access point from a particular client device. The particular client device is associated with the first access point. Moreover, the network device selects a second access point that is located in a radio frequency neighborhood of the particular client device. Further, the network device determines that the second access point has capacity to accept the call request from the particular client device, and steers the client device to associate with the second access point.

11 Claims, 5 Drawing Sheets

(56) References Cited

U.S. PATENT DOCUMENTS

| | | | |
|---|---|---|---|
| 2009/0003324 A1* | 1/2009 | Zhao | H04L 12/5695 |
| | | | 370/353 |
| 2011/0058473 A1* | 3/2011 | Krym | H04W 48/06 |
| | | | 370/232 |
| 2013/0294248 A1 | 11/2013 | Szab et al. | |
| 2014/0059218 A1 | 2/2014 | Ganu et al. | |
| 2015/0319657 A1* | 11/2015 | Fan | H04W 36/08 |
| | | | 370/332 |

* cited by examiner

METHOD AND APPARATUS FOR USING CALL ADMISSION CONTROL FOR CLIENT BALANCING

FIELD

Embodiments of the present disclosure relate to client management in wireless networks. In particular, embodiments of the present disclosure describe a system and a method for using call admission control for client balancing in wireless networks.

BACKGROUND

Currently, client load balancing on an access point ("AP") in a wireless network generally is based on the total load at the AP. Specifically, the amount of load on an AP may be determined based on the number of client devices and overall capacity of each AP in the network, as well as the airtime used by each client device, the client's health metric, type of client traffic (e.g., VoIP and/or video calls), etc. The client's health metric typically is a comparison of the client's actual physical layer rate to its theoretical capacity.

Nevertheless, a load balancing scheme based on the current criteria may still fail to move the client devices to the optimal AP in some scenarios. For example, consider an AP where a couple client devices are connected as well as a few WiFi phones. Based on the number or percentage of VoIP calls assigned at the AP, the AP may have reached its capacity for call admissions, and thus will be rejecting subsequent call requests received from the client devices. As a result, this will cause call failures for the client devices. However, the network infrastructure could have residual call capacity at a neighboring AP. Yet the network infrastructure would not move the client devices to the neighboring AP that is capable of admitting the call by the client device, because according to the current client balancing scheme, no threshold is reached (e.g., client health metric and radio load are both under threshold values). This is a typical use case scenario for hospitals and other environments where VoIP phones are widely used in addition to other WiFi® devices. Therefore, it is desirable to develop a comprehensive client balancing scheme that incorporates call admission control data.

DETAILED DESCRIPTION

In the following description, several specific details are presented to provide a thorough understanding. While the context of the disclosure is directed to client balancing in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to client management in wireless networks. In particular, embodiments of the present disclosure describe a system and a method for using call admission control for client balancing in wireless networks.

According to embodiments of the present disclosure, for each AP in a network, the network infrastructure determines the residual airtime available for call admission control based on a predefined VoIP limit and the number of active calls. The network also monitors the add-tspec-response frames generated as by a station management process and triggers the search for a better AP when responding to a client device whose medium-time is marked as 0, indicating that the call is not admitted. Furthermore, the network monitors the responses to SIP invites and tracks the client devices to which the network sends a response with one or more of the following status codes:

480: Temporary Unavailable
486: Busy Here
503: Service Unavailable
none: Don't send SIP status code The network will load balance client devices that have made calls in the past, but do not have any ongoing active calls to other APs in the neighborhood.

Network Environment

Figure 1:
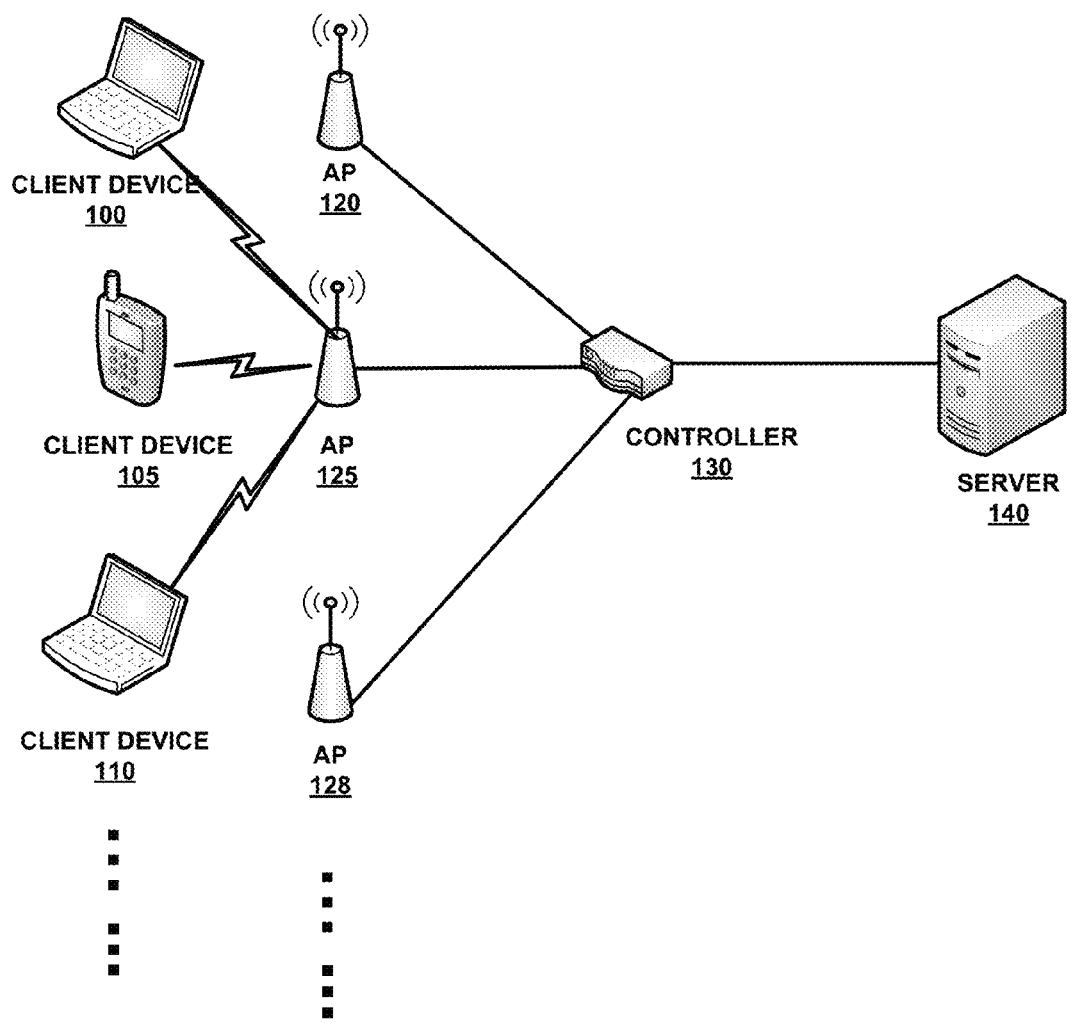
FIG. 1 is a block diagram illustrating an exemplary network environment for using call admission control for client balancing according to embodiments of the present disclosure.

FIG. 1 is a block diagram illustrating an exemplary network environment that uses call admission control for client balancing according to embodiments of the present disclosure. The network environment as illustrated in FIG. 1 includes at least a controller 130, a server 140, a number of access points (APs), such as AP 112, $AP_B$ 125, AP 128, etc., and a number of client devices, such as Client 100, Client 105, Client 110, etc.

Each AP provides network services to zero or more client device. Specifically, each AP operates on a particular wireless communication channel and communicates with its client devices on the particular wireless communication channel. For example, in FIG. 1, AP 125 provides network services to client devices, including Client 100, Client 105, and Client 110. A neighboring AP, such as AP 110 or AP 128 provides network services to other client devices in the wireless network.

Client devices may be running a number of applications, including but not limited to, VoIP applications, voice/video streaming applications, uniform communication applications, etc. Such applications on a client device may need to initiate a call over the wireless network while the client device is associated with an access point. Specifically, the client device initially sends a request for a call to the access point that it is associated with. When the AP receives the request, the AP determines whether it has the capacity to admit the call. Note that the AP makes the decision based on a call admission control scheme that is independent of the conventional client load balancing criteria, which are usually based on radio parameters rather than client requirements or conditions.

Network controller 130 generally refers to a controlling device that manages other network devices such as wireless access points. Network controller 130 may handle automatic adjustments to radio frequency power, wireless channels, wireless authentication, and/or security. More importantly, based on information collected by various network devices in the network, network controller 130 can determine how to move a subset of client devices from associating with one AP to associating with another AP in the network to achieve better user experience and network performance. Once network controller 130 determines to move a client device (e.g., Client 100) from its current AP (e.g., AP 125) to a new AP (e.g., AP 120), network controller 130 sends an instruction to AP 125 to de-authenticate the client device. Also, AP 125 will refrain from responding to subsequent connection requests received from Client 100. Meanwhile, the neighboring AP, e.g., AP 120, will respond to Client 100's request. As a result, Client 100 will be connecting to AP 120 instead of AP 125 after being de-authenticated by AP 125.

Server 140 can be any network servers that are configured with additional processing, memory and storage capacity to handle the load of servicing client devices, including but not limited to, web servers, proxy servers, File Transfer Protocol (FTP) servers, authentication servers, Dynamic Host Configuration Protocol (DHCP) servers, etc.

Call Admission Control

Call admission control ("CAC") generally refers to the process of regulating traffic volume in voice communications, particularly in wireless networks and in VoIP (Voice over Internet). Call admission control can be used to ensure or maintain a certain level of audio quality in voice communications networks.

Most CAC algorithms work by regulating the total utilized bandwidth, the total number of calls, or the total number of packets or data bits passing a specific point per unit time. If a defined limit is reached or exceeded, a new call may be prohibited from entering the network until at least one current call terminates. A typical CAC scheme may take into account the frame length (e.g., MSDU length), the rate supported by the client device, the minimum physical layer transmission rate required for the call, etc. It is important to note that the considerations in the call admission control scheme are specific to client devices, and not network radio frequency environmental factors.

In some embodiments, new calls are denied entry if the audio quality of individual calls can deteriorate to a certain extent. In some embodiments, the network infrastructure regulates calls according to defined characteristics such as priority descriptors. In some embodiments, new calls are denied from entering the network if the resources of the central processing unit (CPU) of a particular computer or server would be overburdened by such calls.

In some embodiments, CAC processing is performed in the station management (STM) layer of the control plane. In some embodiments, the CAC processing can be performed in the driver of a hardware chip. In some embodiments, the CAC processing can be performed partly in the control plane and partly in the driver.

A CAC profile can be configured with the parameters specified in Table 1 below.

TABLE 1

CAC Profile

| Parameter | Description |
| --- | --- |
| VoIP Call Admission Control | Shows if the profile enables or disables WiFi VoIP Call Admission Control features. |
| VoIP Bandwidth based CAC | Shows the desired call admission control (CAC) Mechanism:<br>    Disable - CAC is based on Call Counts<br>    Enable - CAC should be based on Bandwidth. |
| VoIP Call Capacity | Number of simultaneous calls that can be handled by one radio. |
| VoIP Bandwidth Capacity (kbps) | The maximum bandwidth that can be handled by one radio, in kbps. |
| VoIP Call Handoff Reservation | Percentage of call capacity reserved for mobile VoIP clients on call. |
| VoIP Send SIP 100 Trying | Shows if the profile enables or disables sending of SIP 100 - trying messages to a call originator to indicate that the call is proceeding. |
| VoIP Disconnect Extra Call | If enabled, the controller disconnects calls that exceed the high capacity threshold by sending a de-authentication frame. |
| VOIP TSPEC Enforcement | Shows if the profile enables or disables validation of TSPEC requests for CAC. |
| VOIP TSPEC Enforcement Period | Maximum time for the station to start the call after the TSPEC request |
| VoIP Drop SIP Invite and send status code (client) | Display the status code sent back to the client if the profile is configured to drop a SIP Invite:<br>    480: Temporary Unavailable<br>    486: Busy Here<br>    503: Service Unavailable<br>    none: Don't send SIP status code |
| VoIP Drop SIP Invite and send status code (server) | Display the status code sent back to the server if the profile is configured to drop a SIP Invite:<br>    480: Temporary Unavailable<br>    486: Busy Here<br>    503: Service Unavailable<br>    none: Don't send SIP status code |

Client Balancing Using Call Admission Control

Figure 2A:
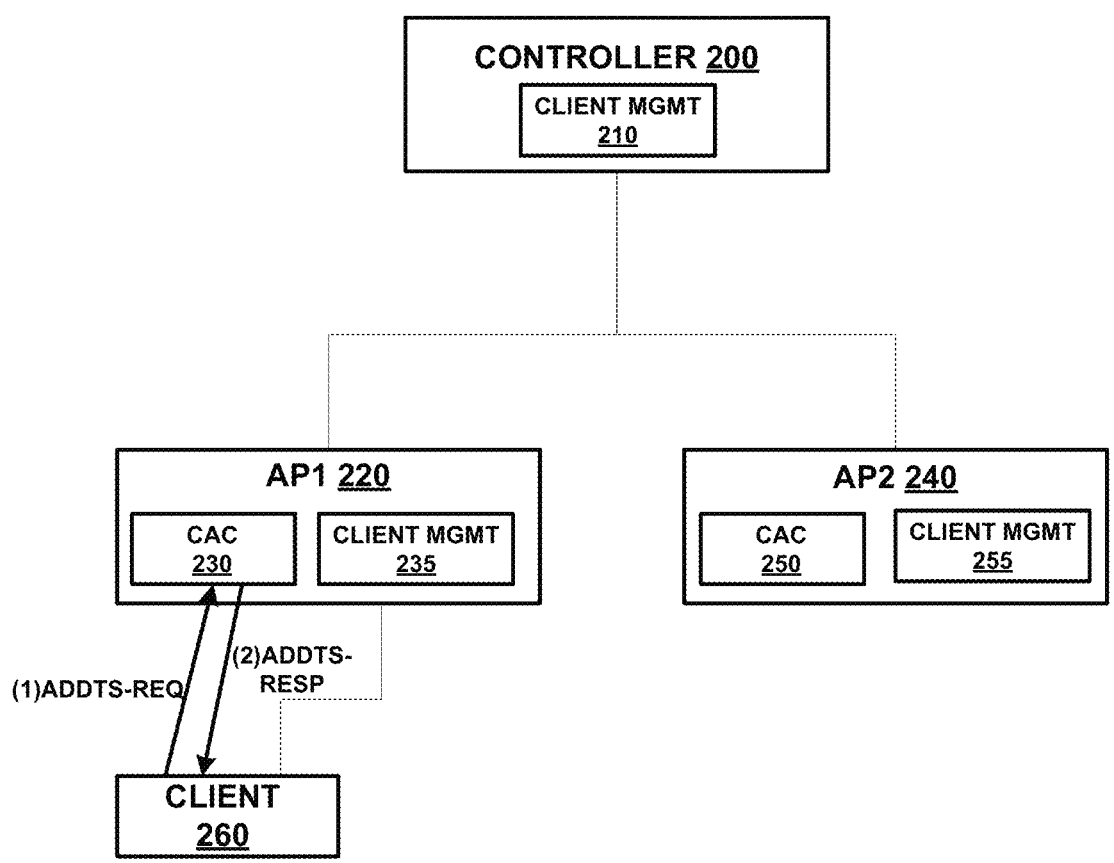
FIG. 2A-2B are block diagrams illustrating exemplary client balancing schemes using call admission control according to embodiments of the present disclosure.
Figure 2B:
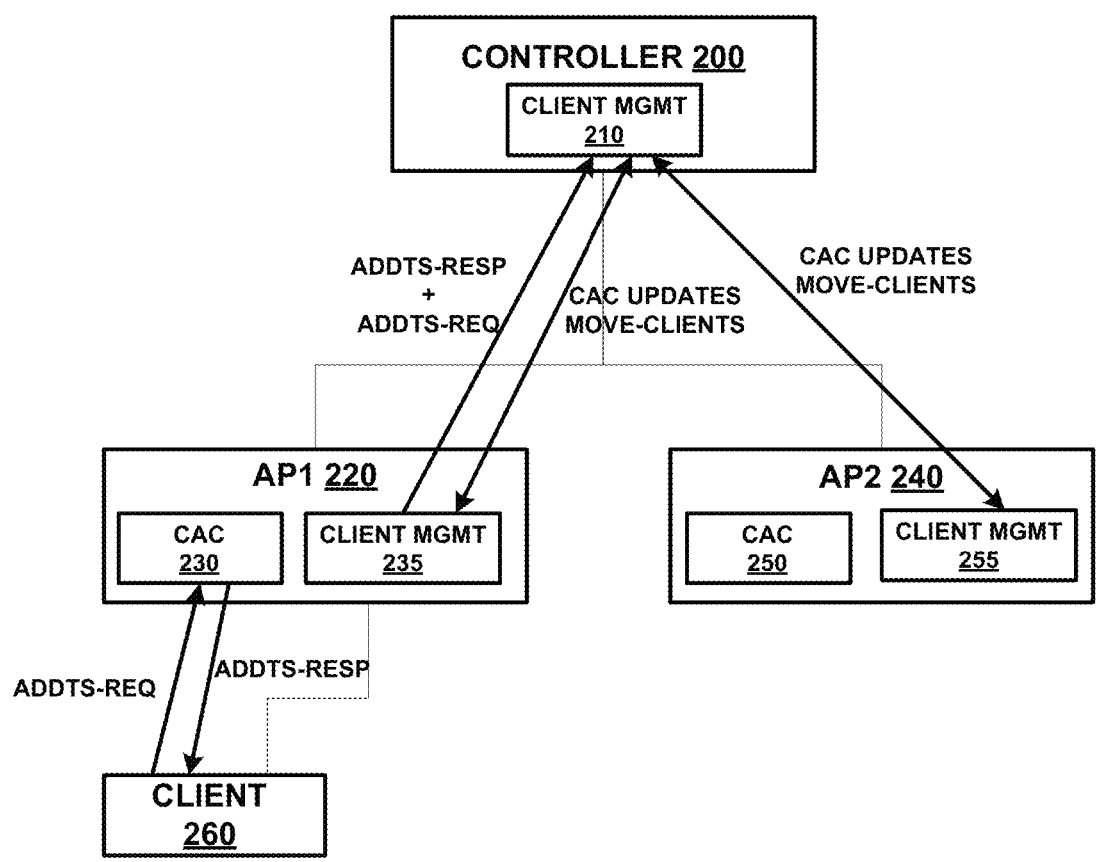

FIGS. 2A-2B are block diagrams illustrating an exemplary network environment for multi-factor authorization in an IEEE 802.1x enabled network according to embodiments of the present disclosure. FIGS. 2A-2B include at least a network controller 200, which manages at least two access points, namely AP1 220 and AP2 240. In addition, FIGS. 2A-2B include a client device 260 that is initially associated with AP1 220.

Each AP has a client management module that communicates with the client management module at the network controller. For example, Client Management 235 at AP1 220 communicates with Client Management 210 at Controller 200. Likewise, Client Management 255 at AP2 240 communicates with Client Management 210 at Controller 200. The client management module is responsible for various client management tasks, including load balancing client devices in the network. The client management module ensures that client devices are balanced based on their airtime consumption and overall load at the APs. In making the load balancing decisions, the client management module considers both the load of the AP that a particular client device is connected to, as well as the neighboring APs that the particular client device can potentially be steered to connect with.

Moreover, each AP also has a call admission control module that performs call admission control tasks as described in the previous section. For example, CAC 230 at AP1 220 manages calls to and from its associated client devices, such as Client 260. Likewise, CAC 260 at AP2 240 manages calls to and from the client devices associated with AP2 240.

As FIG. 2A illustrates, a CAC-compliant client device, e.g., Client 260, will send an add-tspec-request frame (or ADDTS-REQ) to the AP, e.g., AP1 220. Tspec generally refers to traffic specification. Elements of tspec are defined by IEEE 802.11 standards and specify, for each type of traffic (e.g., voice, video, best effort, background, etc.), what is the desired capacity required by the client device.

Upon receiving the add-tspec-request frame, the AP (e.g., AP1 220) will then process this frame and send an add-tspec-response frame (or ADDTS-RESP) to the client device (e.g., Client 260). This response frame contains information indicating whether the call will be admitted by the access point as determined by the CAC at the AP.

Conventionally, Client Management 235 (or Client Management 210) does not communicate with CAC 230. Neither does Client Management 235 takes call admission control into account when making client load balancing decisions. Therefore, even though the calls are not being admitted for that client device (for example, due to the number of active calls handled by the AP has exceeded a threshold), the client health metrics will continue showing that the client device is in a good condition (e.g., receiving good signals from the network). As such, Client Management 235 at the AP will not load balance Client 260, whose recent call request got rejected, to a neighboring AP that has the capacity to handle the call request from Client 260.

FIG. 2B illustrates a load balancing scheme using call admission control. According to the enhanced load balancing scheme in FIG. 2B, for every client device that sends an add-tspec-request frame, the AP will process the request in the same manner as conventionally done. For example, when Client 260 sends ADDTS-REQ to AP1 220, CAC 230 at AP1 220 will determine whether the call will be admitted by AP1 220 and send back ADDTS-RESP.

Unlike conventional mechanism, here, AP1 220 will send the add-tspec-response frame (or ADDTS-RESP) to both the client device (e.g., Client 260) and the client management process (e.g., Client Management 210) running on the network controller (e.g., Controller 200). Moreover, AP1 220 will also send the received add-tspec-request frame (or ADDTS-REQ) to the client management process (e.g., Client Management 210).

In addition, the update from Client Management 235 at AP1 220 to Client Management 210 at Controller 200 also includes one or more of the following: residual airtime for calls at AP1 220; and the number of active calls currently handled by AP1 220.

Next, Client Management 210 at Controller 200 checks whether the call was declined to the client device, for example, based on the medium time. If the call was accepted, then Client Management 210 at Controller 200 takes no further actions. However, if the call request from Client 260 was declined, then Client Management 210 at Controller 200 will determine a suitable AP in the radio frequency neighborhood of AP1 220 (e.g., AP2 240) to move the client device to.

Specifically, Controller 200 can use Client 260's virtual beacon report (VBR) to determine which APs Client 260 can hear in its radio frequency neighborhood. Each AP maintains a virtual beacon report (VBR), which in its initial stage, includes only the client devices that are associated with a respective AP. During VBR propagation, when an AP receives a VBR announcement from a neighboring AP, the AP will compare the client list in the announcement frame with the list of clients that the AP can hear itself. If the AP can hear from a client appearing in a client list obtained from a neighboring AP's VBR announcement, the AP will add the client information from the neighboring AP's VBR announcement frame. Therefore, after the VBRs are propagated, Controller 200 can find out from the VBRs the APs in each client device's radio frequency neighborhood.

Once Controller 200 determines that another AP (e.g., AP2 240) is in the radio frequency neighborhood of Client 260 whose recent call request has been rejected by AP1 220, Controller 200 further determine if the other AP (e.g., AP2 240) will be able to accept the client device's call based on the add-tspec-request frame (or ADDTS-REQ) parameters that Controller 200 received from AP1 220. Controller 200 may evaluate AP2 240's ability to accept the call request from Client 260 based on one or more of the following factors:
  a nominal MSDU length;
  a maximum MSDU length;
  a minimum service interval;
  a maximum service interval;
  an inactivity interval;
  a suspension interval;
  a minimum data rate;
  a mean data rate;
  a peak data rate;
  a minimum physical layer (PHY) rate;
  a surplus bandwidth allowance;
  a medium time.

In some embodiments, Controller 200 first sorts the access points in the radio frequency neighborhood of the client device based on decreasing order of client health metrics. Here, the client health metrics is determined at least based on physical layer rate associated with the particular client device. Next, Controller 200 selects the access point having highest client health metrics from the sorted list, whereas the selected access point also has the residual call admission control capacity to accept the call request from the particular client device.

In some embodiments, Controller 200 first sorts the access points in the radio frequency neighborhood of Client 260 based on decreasing order of residual call admission control capacity at each access point. Then, Controller 200 selects the access point from the sorted list of access points that has the highest residual call admission control capacity, as well as adequate client health to accept the call request from the particular client device.

More specifically, Controller 200 use parameters, such as nominal MSDU length, minimum data rate supported by the client, surplus bandwidth capacity required, and a couple of other parameters into a fraction of airtime metric. The airtime metric is then compared with the residual call admission control capacity reserved at every AP.

If Controller 200 determines that a neighboring AP (e.g., AP2 240) has the capacity to accept the call request from the client device (e.g., Client 260), Controller 200 will then move the client device (e.g., Client 260) to that AP (e.g., AP 240). Otherwise, Controller 200 will check the additional APs in the neighborhood as indicated on the VBR, and repeat the above steps to determine whether any of the additional APs is able to accept the call request from the client device. If so, Controller 200 will move the client device to the identified AP that is able to accept the call request.

In some embodiments, a client device may opt not to be steered to a neighboring AP having residual call admission control capacity to handle the call, and stay connected with the same AP rejecting the call if the client device prefers.

In some embodiments, the CAC can be used in client balancing for any real-time applications, for example, video application, best effort, etc.

Process for Using Call Admission Control for Client Balancing

Figure 3:
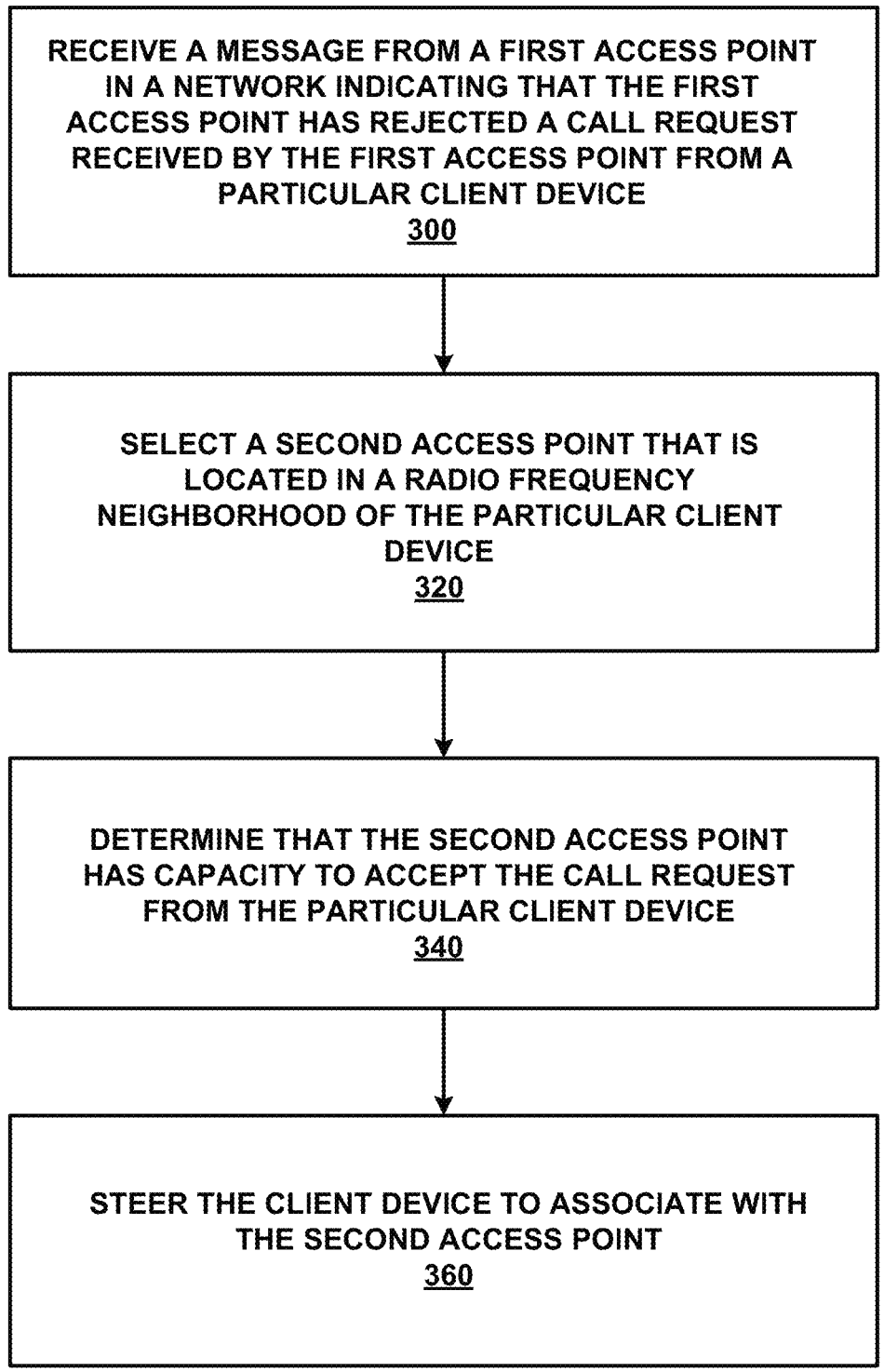
FIG. 3 is a flowchart illustrating a process for using call admission control for client balancing according to embodiments of the present disclosure.

FIG. 3 is a flowchart illustrating a process for using call admission control for client balancing according to embodiments of the present disclosure.

During operations, a network device receives a message from a first access point in a network indicating that the first access point has rejected a call request received by the first access point from a particular client device (operation 300). Here, the particular client device is associated with the first access point. Then, the network device selects a second access point that is located in a radio frequency neighborhood of the particular client device (operation 320). Furthermore, the network device determines that the second access point has capacity to accept the call request from the particular client device (operation 340). Then, the network device steers the client device to associate with the second access point (operation 360).

In some embodiments, the network device also identifies a plurality of access points in the radio frequency neighborhood of the particular client device based on virtual beacon reports received from each access point.

Specifically, in one embodiment, the network device may first sort the plurality of access points based on decreasing order of client health metrics, whereas the client health metrics is determined at least based on physical layer rate associated with the particular client device. Then, the network device may select the second access point from the sorted plurality of access points, where the second access point has highest client health metrics among all access points in the plurality of access points having capacity to accept the call request from the particular client device.

In another embodiment, the network device may first sort the plurality of access points based on decreasing order of residual call admission control capacity at each access point. Then, the network device can select the second access point from the sorted plurality of access points, where the second access point has highest residual call admission control capacity among all access points in the plurality of access points having adequate client health to accept the call request from the particular client device.

The call request received by the first access point from the client device may include one or more of following parameters: a nominal MSDU length; a maximum MSDU length; a minimum service interval; a maximum service interval; an inactivity interval; a suspension interval; a minimum data rate; a mean data rate; a peak data rate; a minimum physical layer (PHY) rate; a surplus bandwidth allowance; a medium time; etc. It is important to note that the above parameters in the call request indicates conditions and/or requirements associated with the client device, rather than radio parameters and/or RF conditions associated with access points in the network.

In some embodiments, the message sent from the first access point to the network device includes both the call request received from the client device and a call response indicating transmitted from the first access point to the client device indicating that the call request is rejected by the first access point.

In some embodiments, the network device further selects the second access point based at least on one or more of: an amount of load on the second access point; a number of client devices associated with the second access point; an overall capacity of the second access point; an amount of airtime used by each client device associated with the second access point; a client health metric associated with the second access point; and a type of client traffic associated with the client device.

System for Using Call Admission Control for Client Balancing

Figure 4:
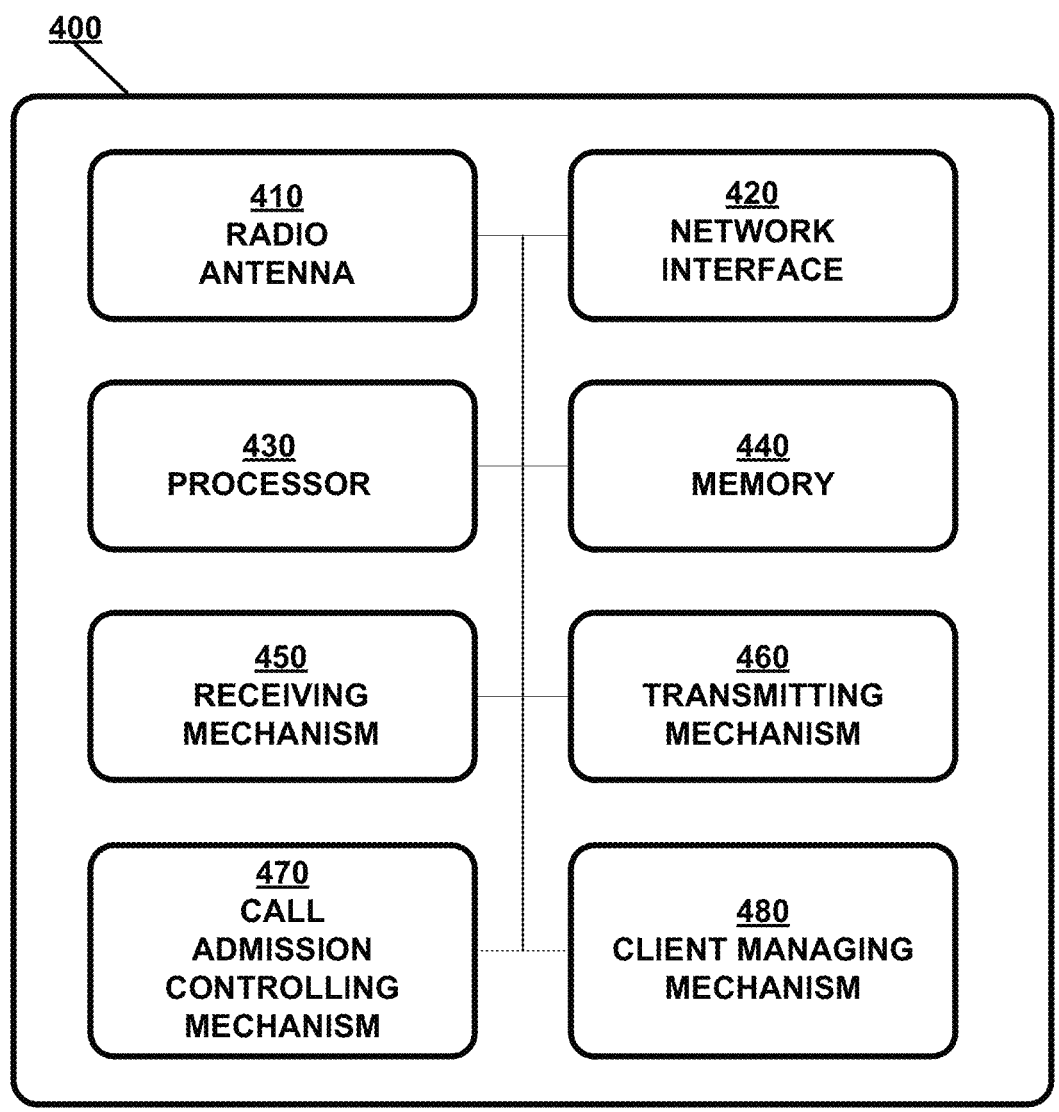
FIG. 4 is a block diagram illustrating a system for using call admission control for client balancing according to embodiments of the present disclosure.

FIG. 4 is a block diagram illustrating an exemplary system for using call admission control for client balancing according to embodiments of the present disclosure. Network device 400 includes at least one or more radio antennas 410 capable of either transmitting or receiving radio signals or both, a network interface 420 capable of communicating to a wired or wireless network, a processor 430 capable of processing computing instructions, and a memory 440 capable of storing instructions and data. Moreover, network device 400 further includes a receiving mechanism 450, a transmitting mechanism 460, a call admission controlling mechanism 470, and a client managing mechanism 480, all of which are in communication with processor 430 and/or memory 440 in network device 400. Network device 400 may be used as a client system, or a server system, or may serve both as a client and a server in a distributed or a cloud computing environment.

Radio antenna 410 may be any combination of known or conventional electrical components for receipt of signaling, including but not limited to, transistors, capacitors, resistors, multiplexers, wiring, registers, diodes or any other electrical components known or later become known.

Network interface 420 can be any communication interface, which includes but is not limited to, a modem, token ring interface, Ethernet interface, wireless IEEE 802.11 interface, cellular wireless interface, satellite transmission interface, or any other interface for coupling network devices.

Processor 430 can include one or more microprocessors and/or network processors. Memory 440 can include storage components, such as, Dynamic Random Access Memory (DRAM), Static Random Access Memory (SRAM), etc.

Receiving mechanism 450 generally receives one or more network messages via network interface 420 or radio antenna 410 from a wireless client. The received network messages may include, but are not limited to, requests and/or responses, beacon frames, management frames, control path frames, and so on.

Specifically, receiving mechanism 450 may receive a message from a first access point in a network indicating that the first access point has rejected a call request received by the first access point from a particular client device. In some embodiments, the message includes both the call request received from the client device and a call response indicating transmitted from the first access point to the client device indicating that the call request is rejected by the first access point.

The call request received by the first access point from the client device may include one or more of following parameters: a nominal MSDU length; a maximum MSDU length; a minimum service interval; a maximum service interval; an inactivity interval; a suspension interval; a minimum data rate; a mean data rate; a peak data rate; a minimum physical layer (PHY) rate; a surplus bandwidth allowance; a medium time; etc. It is important to note that the above parameters in the call request indicates conditions and/or requirements associated with the client device, rather than radio parameters and/or RF conditions associated with access points in the network.

Transmitting mechanism 460 generally transmits messages, which include, but are not limited to, requests and/or responses, beacon frames, management frames, control path frames, and so on.

Call admission controlling mechanism 470 generally determines whether a call request from a client device shall be accepted or denied based on preconfigured call admission control parameters. Specifically, call admission controlling mechanism 470 can determine whether a second access point in the radio frequency neighborhood of a particular client device has capacity to accept the call request from the particular client device.

Client managing mechanism 480 generally determines whether a client device shall be managed by a alternative access point in the network for better network performance.

Specifically, client managing mechanism 480 can select a second access point that is located in a radio frequency neighborhood of the particular client device. In some embodiments, client managing mechanism 480 can identify a plurality of access points in the radio frequency neighborhood of the particular client device based on virtual beacon reports received from each access point.

Furthermore, in some embodiments, client managing mechanism 480 sorts the plurality of access points based on decreasing order of client health metrics, whereas the client health metrics is determined at least based on physical layer rate associated with the particular client device. Then, client managing mechanism 480 selects the second access point from the sorted plurality of access points, where the second access point has highest client health metrics among all access points in the plurality of access points having capacity to accept the call request from the particular client device.

In some embodiments, client managing mechanism 480 sorts the plurality of access points based on decreasing order of residual call admission control capacity at each access point. Then, client managing mechanism 480 selects the second access point from the sorted plurality of access points, where the second access point has highest residual call admission control capacity among all access points in the plurality of access points having adequate client health to accept the call request from the particular client device.

In some embodiments, client managing mechanism 480 selects the second access point based at least on one or more of: an amount of load on the second access point; a number of client devices associated with the second access point; an overall capacity of the second access point; an amount of airtime used by each client device associated with the second access point; a client health metric associated with the second access point; a type of client traffic associated with the client device; etc.

Upon selecting the second access point, client managing mechanism 480 can then communicate with client managing modules at the access points to steer the client device to associate with the second access point.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   receiving a message from a first access point in a network indicating that the first access point has rejected a call request received by the first access point from a particular client device, wherein the particular client device is associated with the first access point;
   selecting a second access point that is located in a radio frequency neighborhood of the particular client device, wherein selecting the second access point includes:
      identifying a plurality of access points in the radio frequency neighborhood of the particular client device based on virtual beacon reports received from each access point;
      sorting the plurality of access points based on decreasing order of client health metrics, wherein the client health metrics is determined at least based on physical layer rate associated with the particular client device; and
      selecting the second access point from the sorted plurality of access points, wherein the second access point has highest client health metrics among all access points in the plurality of access points having capacity to accept the call request from the particular client device; and
   steering the client device to associate with the second access point.

2. The medium of claim 1, the call request comprises one or more of following parameters:
   a nominal MSDU length;
   a maximum MSDU length;
   a minimum service interval;
   a maximum service interval;
   an inactivity interval;
   a suspension interval;
   a minimum data rate;
   a mean data rate;
   a peak data rate;
   a minimum physical layer (PHY) rate;
   a surplus bandwidth allowance; and
   a medium time.

3. The medium of claim 1, wherein parameters in the call request indicates conditions and/or requirements associated with the client device and not radio parameters associated with access points in the network.

4. The medium of claim 1, wherein the message comprises the call request received from the client device and a call response indicating transmitted from the first access point to the client device indicating that the call request is rejected by the first access point.

5. The medium of claim 1, further comprising:
   selecting the second access point based at least on one or more of:
   an amount of load on the second access point;
   a number of client devices associated with the second access point;
   an overall capacity of the second access point;
   an amount of airtime used by each client device associated with the second access point;
   a client health metric associated with the second access point; and
   a type of client traffic associated with the client device.

6. A system comprising:
   at least one device including a hardware processor;
   the system being configured to perform operations comprising:
   receiving a message from a first access point in a network indicating that the first access point has rejected a call request received by the first access point from a particular client device, wherein the particular client device is associated with the first access point;
   selecting a second access point that is located in a radio frequency neighborhood of the particular client device, wherein selecting the second access point includes:
      identifying a plurality of access points in the radio frequency neighborhood of the particular client device based on virtual beacon reports received from each access point;

sorting the plurality of access points based on decreasing order of residual call admission control capacity at each access point; and selecting the second access point from the sorted plurality of access points, wherein the second access point has highest residual call admission control capacity among all access points in the plurality of access points having adequate client health to accept the call request from the particular client device; and steering the client device to associate with the second access point.

7. The system of claim 6, the call request comprises one or more of following parameters:
   a nominal MSDU length;
   a maximum MSDU length;
   a minimum service interval;
   a maximum service interval;
   an inactivity interval;
   a suspension interval;
   a minimum data rate;
   a mean data rate;
   a peak data rate;
   a minimum physical layer (PHY) rate;
   a surplus bandwidth allowance; and
   a medium time.

8. The system of claim 6, wherein parameters in the call request indicates conditions and/or requirements associated with the client device and not radio parameters associated with access points in the network.

9. The system of claim 6, wherein the message comprises the call request received from the client device and a call response indicating transmitted from the first access point to the client device indicating that the call request is rejected by the first access point.

10. The system of claim 6, further comprising:
    selecting the second access point based at least on one or more of:
    an amount of load on the second access point;
    a number of client devices associated with the second access point;
    an overall capacity of the second access point;
    an amount of airtime used by each client device associated with the second access point;
    a client health metric associated with the second access point; and
    a type of client traffic associated with the client device.

11. A method comprising:
    receiving, by a network controller device, a message from a first access point in a network indicating that the first access point has rejected a call request received by the first access point from a particular client device, wherein the particular client device is associated with the first access point;
    selecting, by the network controller device, a second access point that is located in a radio frequency neighborhood of the particular client device, wherein selecting the second access point includes:
        identifying a plurality of access points in the radio frequency neighborhood of the particular client device based on virtual beacon reports received from each access point;
        sorting the plurality of access points based on decreasing order of client health metrics, wherein the client health metrics is determined at least based on physical layer rate associated with the particular client device; and
        selecting the second access point from the sorted plurality of access points, wherein the second access point has highest client health metrics among all access points in the plurality of access points having capacity to accept the call request from the particular client device; and
    instructing, by the network controller device, the first access point and the second access point to steer the client device to disassociate with the first access point and associate with the second access point.

* * * * *